(12) United States Patent
Fushimi et al.

(10) Patent No.: US 6,754,144 B1
(45) Date of Patent: Jun. 22, 2004

(54) OPTICAL INFORMATION RECORDING/ REPRODUCING APPARATUS

(75) Inventors: Tetsuya Fushimi, Hitachinaka (JP); Toshimitsu Kaku, Sagamihara (JP); Hisataka Sugiyama, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/506,272

(22) Filed: Feb. 17, 2000

(30) Foreign Application Priority Data

Feb. 26, 1999 (JP) .......................................... 11-049651

(51) Int. Cl.[7] .................................................. G11B 7/00
(52) U.S. Cl. .............................. 369/44.25; 369/44.29; 369/44.35
(58) Field of Search .......................... 369/13.24, 124.05, 369/116, 53.27, 13.35, 47.45, 47.48, 47.53, 53.28, 44.11, 44.25, 44.28, 44.32, 44.35, 44.29, 44.34

(56) References Cited

U.S. PATENT DOCUMENTS

| 4,982,389 A | * | 1/1991 | Nakao et al. | 369/13.24 |
|---|---|---|---|---|
| 5,528,573 A | * | 6/1996 | Shim | 369/47.45 |
| 5,642,343 A | * | 6/1997 | Toda et al. | 369/47.53 |
| 5,896,354 A | * | 4/1999 | Yamashita et al. | 369/44.34 |
| 5,901,121 A | * | 5/1999 | Yamashita et al. | 369/44.28 |
| 6,249,496 B1 | * | 6/2001 | Tsukahara et al. | 369/44.28 |

* cited by examiner

*Primary Examiner*—Ali Neyzari
(74) *Attorney, Agent, or Firm*—Mattingly, Stanger & Malur, P.C.

(57) ABSTRACT

In an optical information recording/reproducing apparatus, in which two sets of circuits (including a comparator 104 and a time counting device 105 (i.e., pulse width detector), and a comparator 110 and a time counting device 111 (i.e., pulse width detector)) are provided for detecting that the fluctuation larger than a comparison level continues in the TE signal for a time period, each being set at the respective comparison level and the time duration, differently, thereby the operation of write or erase onto an optical disc 101 is stopped even if only one of them is detected. Also, a position or location information in the PID portion to be reproduced, being outputted from a PID register 107, and a location information which is read out by the PID decoder 106 are compared by a comparator 108, thereby stopping the operation of write or erase onto the optical disc 101 if they are inconsistent with.

14 Claims, 8 Drawing Sheets

G: GROOVE PORTION 201
L: LAND PORTION 202
PID: PID PORTION 204

OPTICAL INFORMATION RECORDING/ REPRODUCING APPARATUS

BACKGROUND OF THE INVENTION

The present invention relates to a technology of recording and/or reproducing of an optical information, with which an information can be written or erased on an information recording medium by irradiating a light thereupon.

Conventionally, the optical information recording and/or reproducing (recording/reproducing) apparatuses of various methods are already known and actually practiced in products, in which an information is optically read out from a disc-like information recording medium, on which the information is recorded by use of a phase change being reversibly changeable between a crystal state and an amorphous state, being different in reflectivity to each other, so as to be reproduced. Also, in particular in recent years, as an information recording medium being able to record a large amount of information thereon, with increasing the recording density of the information, for example, a one being called by a DVD-RAM (Digital Versatile Disc-Random Access Memory) disc was proposed and attracts attentions thereto. And, also an optical information recording/reproducing apparatuses was already on the market, which can perform the recording and reproducing of the information on and from such the DVD-RAM disc.

As an aspect to be paid attentions when writing or erasing the information on the information recording medium being recordable with information, there is a phenomenon which is called by "off track". The off track means a phenomenon, in which an optical spot formed on a recording surface of the optical disc comes to be off from a track to be scanned or traced inherently, due to the external factors, such as vibration of the apparatus or the like, and the internal factors, such as an abnormal function of a tracking controller circuit for scanning or tracking it around a center of the track or the like, and further other factors of the optical disc itself, such as, scratches, dirt, defects on the optical disc surface, etc.

If the off track occurs during the writing or erasing of the information, since it occasionally erases the information on other track(s) erroneously, therefore it is necessary to watch whether the off track occurs or not always, so as to stop the write or erase operation when it actually occurs.

Figure 6:
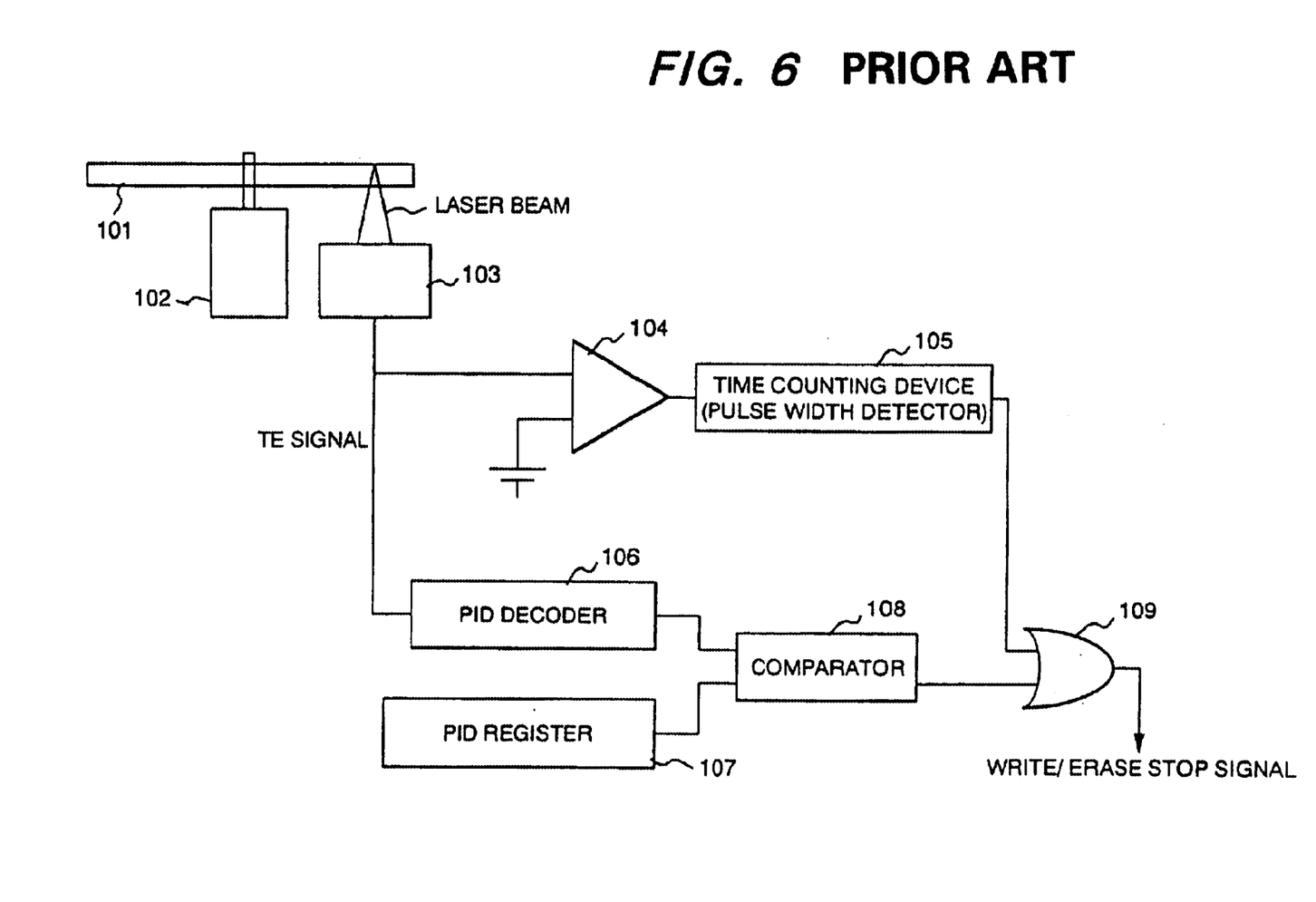
FIG. 6 shows a block diagram of the conventional optical information recording/reproducing apparatus with which can be detected the phenomenon of off track.

In the optical information recording/reproducing apparatus, the phenomenon of this off track is detected with such the construction as shown in FIG. 6. Hereinafter, explanation will be given on the optical information recording/reproducing apparatus which can detects the off track, by referring to the FIG. 6. This figure is a block diagram for showing the construction which is necessary for the detection of the off track in the optical information recording/reproducing apparatus, therefore other portion or construction thereof is omitted to be shown here.

An optical disc 101 is rotated by a spindle motor 102, and on a recording surface of the optical disc 101 is irradiated a laser beam from an optical head or pickup 103 to be formed as an optical spot on it. Then a reflection light of the laser beam irradiated upon the optical disc 101 is detected by the optical head (pickup) 103, so as to form various signals depending upon the level of the reflection light therefrom. Among the signals formed, a signal called by a tracking error signal (i.e., a TE signal) to be used for a tracking control, indicating an amount of fluctuation with respect to a center of the track, is determined whether it exceeds a comparison (or reference) level or not in the level thereof (i.e., the voltage) by means of a comparator 104, so as to output a signal, which turns to a high level during when it exceeds the comparison level while a low level during when it does not. A time counting device 105 (i.e., pulse width detector) measures or counts up the time length during when the signal outputted from the comparator 104 is at the high level. If the time duration of the output exceeds a predetermined time period, since there is a possibility that the optical spot may or has already come off erroneously into other track, then a signal is outputted to an OR circuit 109.

While, since it is possible to read out an information of bits which are formed on a PID portion of the optical disc 101 from the TE signal, the TE signal is decoded in a PID decoder 106, so as to read out the information therefrom. In the pit information of the PID portion is contained a position or location information on the track, therefore it can be acknowledged on which track the optical spot is tracking or scanning at present. /Also, in a PID register 107 is memorized an order of the location information on the track, before performing the recording and/or reproducing of the information in advance. Then, a comparator 108 receives the location information of the PID portion 107 which will be read out from the optical disc next, and compares this information with the location information of the PID portion which is actually read out by the PID decoder 106. If the result of the comparison is inconsistent with, it can be acknowledged that the optical spot comes off into other track erroneously, therefore a signal is outputted to the OR circuit 109.

And, the OR circuit 109 outputs a stop signal of write or erase when the signal is inputted from the time counting device 105 or the comparator 108, thereby to stop the operation of write or erase of the information by the optical information recording/reproducing apparatus.

With such the conventional optical information recording/reproducing apparatus as mentioned in the above, however, if the comparison level is set to be low in the comparator 104 so as to set the period of the time counting device 105 (i.e., pulse width detector) short, there is a margin in relation to the detection on the off track phenomenon, therefore it can detects both, an abrupt change and a slow change in the position where the optical spot is formed. However, there is still a possibility that the signal is outputted from the time counting device 105 (i.e., pulse width detector) even upon a small fluctuation in the TE signal, such as a noise component (s) of the TE signal, thereby stopping the operation of write or erase in spite of no occurrence of the off track.

On the other hand, if the comparison level is set to be high in the comparator 104 so as to set the period of the time counting device 105 (i.e., pulse width detector) long, there is no margin in relation to the detection on the of f track phenomenon, therefore it cannot detect the abrupt change of the position where the optical spot is irradiated, in a radial direction thereof, thereby bringing about a possibility that the write or erase of the information is performed on other track.

Further, for detecting the off track phenomenon from the comparison result by means of the comparator 108, there is a necessity to read out the information of the PID portion. Saying contrary to this, it is impossible to detect the off track phenomenon not so far as the information of the PID portion can be read out, therefore there is a possibility that the write or erase of the information has been already done on other track at the time point when the off track is detected if the off tack occurred before reading out of the information of the PID portion.

SUMMARY OF THE INVENTION

An object according to the present invention is, for dissolving such the problems, to provide an optical information recording/reproducing apparatus, with which the possibility of performing the operation of write or erase of an information on other track(s), and also the possibility of the erroneous detection of the phenomenon of the off track can be reduced.

According to the present invention, for dissolving the above-mentioned object, there is provided an optical information recording/reproducing apparatus for performing an operation of write or erase of information on an optical disc, comprising:

means for irradiating an optical spot on said optical disc;

means for controlling fluctuation in position of said optical spot, with respect to a track center on said optical disc, in a radial direction thereof;

a first means for stopping the operation of the write or erase of information, if the fluctuation in position of said optical spot in the radial direction is equal or more than a first fluctuation amount and if a time period during when the positional fluctuation is equal or more than the first fluctuation amount is equal or longer than a first time period; and a second means for stopping the operation of the write or erase of information, if the fluctuation in position of said optical spot in the radial direction is equal or more than a second fluctuation amount and if a fluctuation time period during when the positional fluctuation is equal or more than the second fluctuation amount is equal or longer than a second time period.

BRIEF DESCRIPTION OF THE DRAWINGS

FIG. 1 shows a block diagram of an example of an optical information recording/reproducing apparatus in which the present invention is applied to;

FIG. 2 shows a partial enlarged view of an example of an optical disc 101 on which an information is written or erased by the optical information recording/reproducing apparatus in which the present invention is applied to;

FIGS. 5(A) and (B) show relationships between a groove portion 201, a land portion 202 or a PID portion 204 and the TE signal 401;

FIGS. 8(A) and (B) are views for showing various examples of the locus of the optical spot with respect to the optical disc 101.

DESCRIPTION OF PREFERRED EMBODIMENT(S)

Hereinafter, embodiments according to the present invention will be fully explained by referring to the attached drawings.

Figure 2:
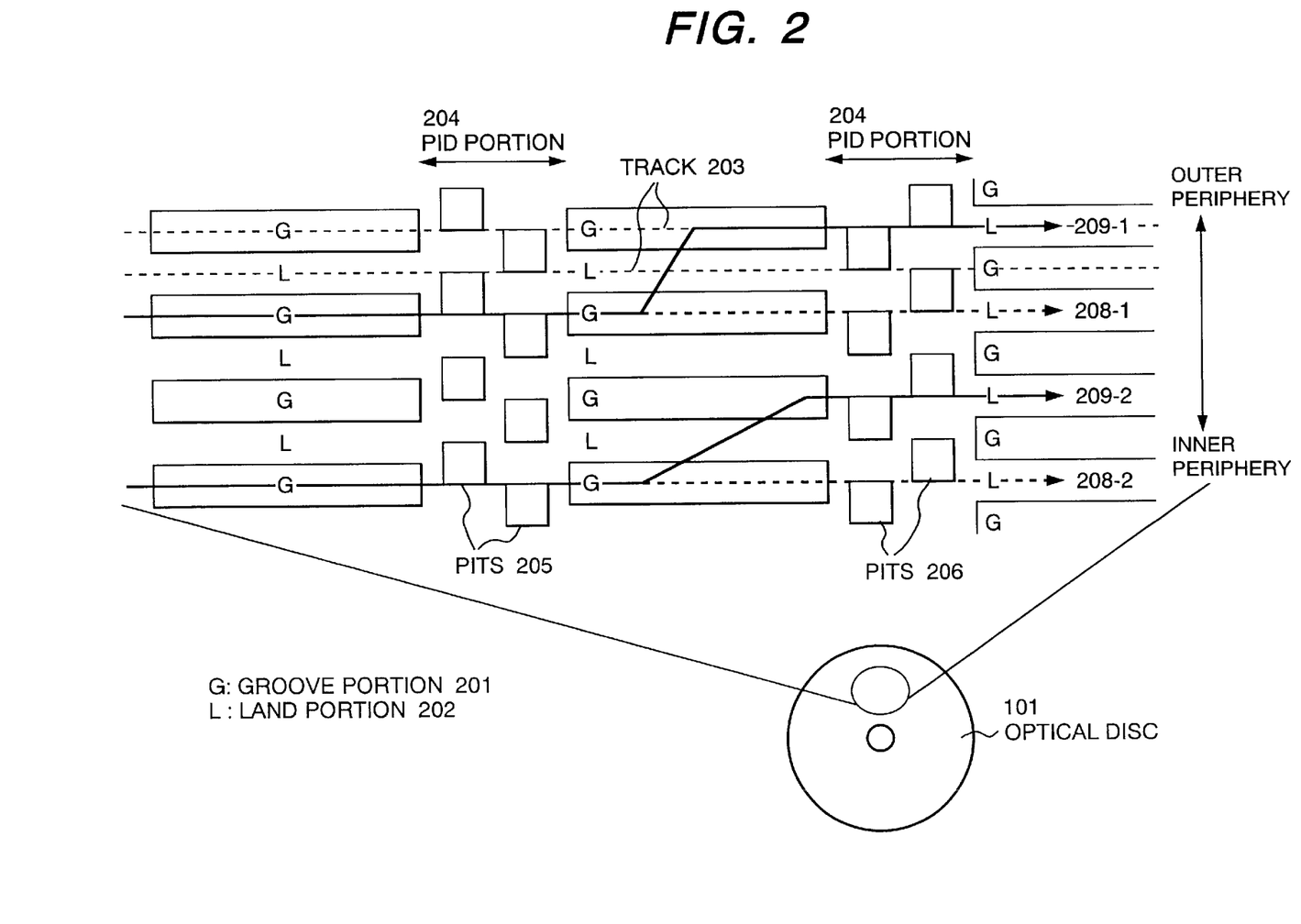

For easy understanding of the present invention, explanation will be given on the structure of an optical disc and on the phenomenon of the "off track", first. FIG. 2 is the partial enlarged view for showing an example of an optical disc 101 on which an information is written or erased by the optical information recording/reproducing apparatus in which the present invention is applied to.

On this optical disc 101, an information can be written or erased on both a groove portion 201 (G) and a land portion 202 (L) thereof. The groove portion 201 (G) and the land portion 202 (L) are formed for an every turn-around of the optical disc, alternately, and along with a track 203. PID portions 204 are provided between the groove portion 201 and the land portion 202, each being at a predetermined distance therefrom, and in the PID portion 204 are formed pits 205 and 206, respectively. Those pits 205 and 206 are off-set in the direction of an inner periphery or in the direction of an outer periphery with respect to the track 203, respectively, and are formed at a depth being nearly equal to that of the groove portion 203.

The direction of scanning or tracing of the pits 205 or 206 is changed or altered between when an optical spot is scanned or tracked along with the track 203 of the groove portion 201 and when it scanned or tracked along with the track of the land portion 202. In an example shown in the present figure, when scanning or tracking on the track of the groove portion 201, the pit 205 being off-set at the inner periphery side is scanned or traced after scanning or tracing the pit 205 being off-set at the outer periphery side. On the other hand, when scanning or tracking on the track of the groove portion 202, the pit 205 being off-set at the outer periphery side is scanned or traced after scanning or tracking the pit 205 being off-set at the inner periphery side.

Further, the pits 206 are formed in an order of the off-sets reversed to that of the pits 205, in order to show the alternation of the track 203 from the groove potion 201 to the land portion 202. Accordingly, also the direction of scanning or tracing of the pits 206 is reversed to that of the pits 205 mentioned in the above.

Also, in FIG. 2 are shown loci or tracks 208 and 209 of the optical spot illustratively. Normally, the optical spot takes a step along with the locus 208 indicated by a dotted line when scanning or tracking the track so as to write or erase the information thereon, thereby performing the write or erase of the information. However, when the optical spot comes to be changed or fluctuated at an irradiation position thereof in a radial direction so that the off track occurs, due to the external factors, such as vibration of the apparatus or the like, the internal factors, such as an abnormal function of a tracking controller circuit for scanning or tracking around a center of the track, or the like, and further other factors of the optical disc itself, such as, scratches, dirt, defects on the optical disc surface, etc., then the optical spot comes off the locus 208 to be traced or scanned inherently, thereby taking a step along the locus 209 indicated by a solid line, for example. When it takes along the locus 209, there is a possibility that the information is written or erased on other track(s), erroneously.

Further, on the locus 208, loci 208-1 and 208-2 indicate the ordinary ones thereof, respectively. On the other hand, on the locus 209, a locus 209-1 indicates that which is followed when it changes or fluctuates slowly with respect to the ordinary locus 208-1, and the locus 209-2 that which is followed when it changes or fluctuates abruptly to the ordinary locus 208-2.

With the optical information recording/reproducing apparatus in which the present invention is applied to, being explained hereinafter, the off tack phenomenon, like the locus 209 followed by the optical spot, can be detected, and the operation of write or erase can be stopped when it is detected.

Figure 1:
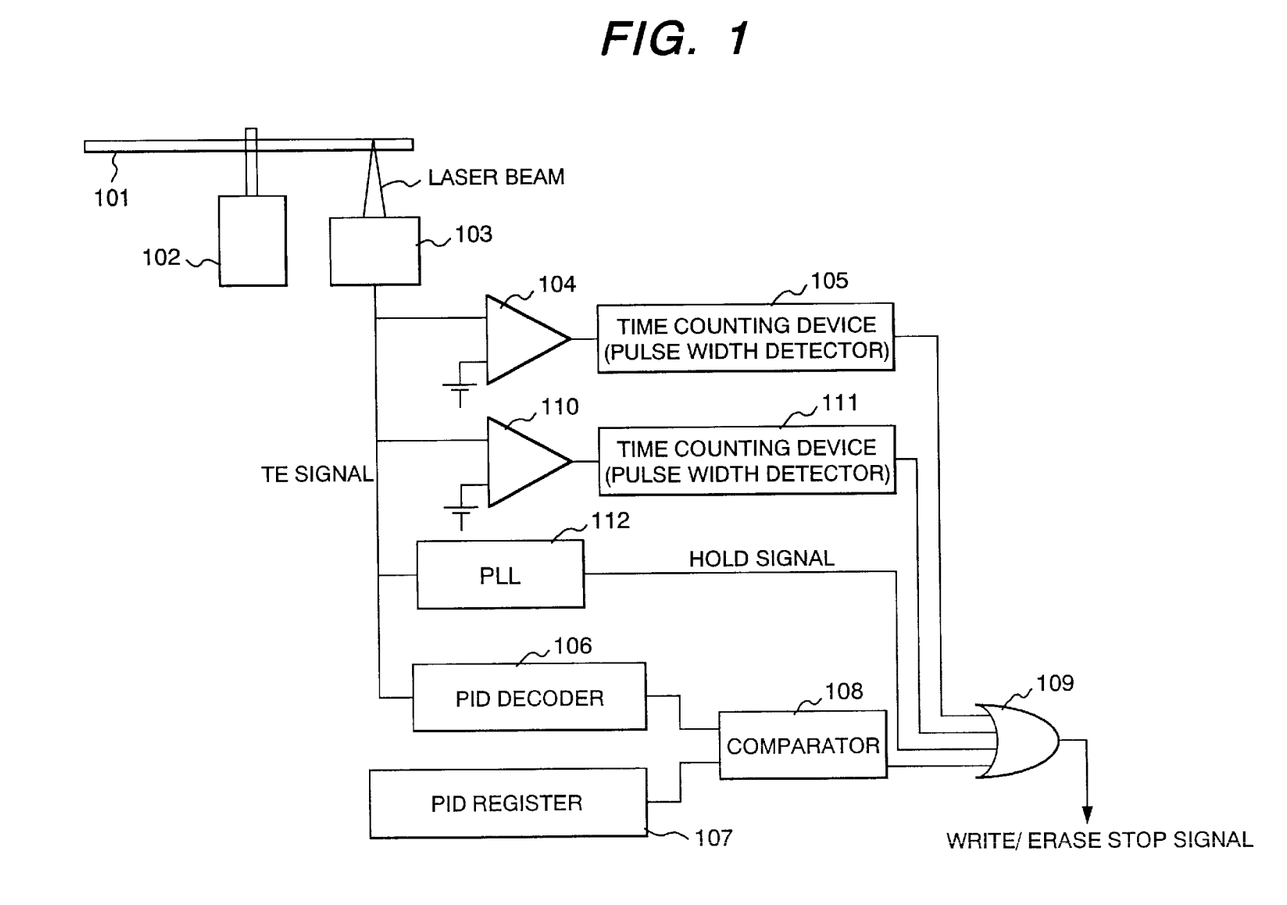

FIG. 1 shows an example of a block diagram of the optical information recording/reproducing apparatus in which the present invention is applied to. The present figure is a block diagram of showing the structure relating to the detection of the off track within the optical information recording/reproducing apparatus. However, explanation on other structures of the optical information recording/reproducing apparatus will be omitted here. Also, each block in the present figure is assumed to be controlled in the operation, by a control means not shown in the figure.

An optical disc 101 is rotated by a spindle motor 102, and on a recording surface of the optical disc 101 is irradiated a laser beam from an optical head (or a pickup) 103 to be formed as an optical spot on it. Then a reflection light of the laser beam irradiated upon the optical disc 101 is detected by the optical head (pickup) 103, and various signals are formed or produced depending upon the level of the reflection light therefrom. Among the signals formed, a signal called by the tracking error signal (i.e., a TE signal), indicating an amount of fluctuation with respect to a canter of the track, is determined whether it exceeds a first comparison (or reference) level 402 or not in the signal level thereof by means of a first comparator 104, so as to output a signal, which turns to a high level during when it exceeds the first comparison level 402 while a signal 404-1 of a low level during when it does not. A first time counting device 105 (i.e., pulse width detector) measures or counts up the time length during when the signal is outputted from the first comparator 104. If the time duration of the output exceeds a first predetermined period t1, since there is a possibility that the optical spot may already come off into other track erroneously, then a signal 405-1 is outputted to an OR circuit 109.

In the same manner, in a second comparator 110, it is determined whether the TE signal exceeds a second comparison (or reference) level 403 or not in the signal level thereof, so as to output a signal, which turns to a high level during when it exceeds the second comparison level 402 while a signal 404-2 of a low level during when it does not. Also a second time counting device 111 (i.e., pulse width detector) measures or counts up the time length during when the signal is outputted from the second comparator 110. If the time duration of the output exceeds a second predetermined period t2, since there is a possibility that the optical spot may already come off into other track erroneously, then a signal 405-2 is outputted to the OR circuit 109.

Then, the OR circuit 109 outputs a stop signal of write or erase when receiving the signal 405-1 or the signal 405-2 from the first time counting device 105 or the second time counting device 111, thereby stopping the operation of write and erase of the information.

Figure 3:
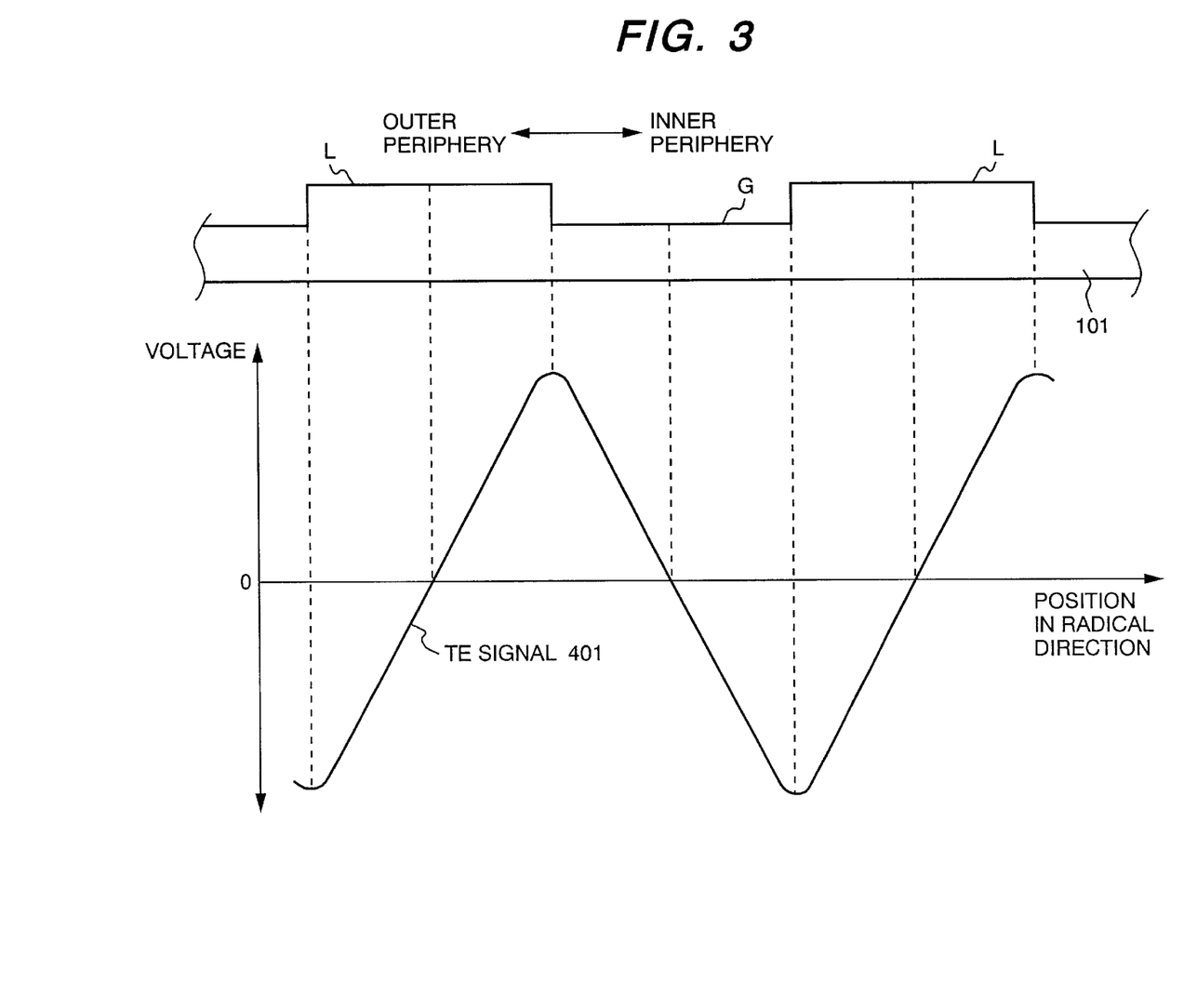
FIG. 3 depicts wave-forms for showing a relationship between the structure of the optical disc 101 and a TE signal 401.

Here, explanation will be given on a relationship between the structure of the optical disc 101 and the signal level of the TE signal which can be obtained by detecting the light returned from the optical disc 101 and the comparison level. FIG. 3 is a view for showing the relationship between the structure of the optical disc 101 and the TE signal 401. In the present figure, a cross-section of the optical disc 101 is shown in an upper portion, while the wave-form of the TE signal in relationship between a position in the radical direction of the optical disc 101 or the value (i.e., voltage) of the TE signal in a lower portion.

The TE signal 401 is a signal indicative of the amount of fluctuation in the radial direction with respect to the track 203, as is mentioned in the above, and it is at a standard or reference level (ordinarily, voltage 0) when it is located at a cent of the track. And the level (voltage) thereof rises up or falls down upon the shifting (the amount of fluctuation) from the center of the track, and it takes a maximum or a minimum level (voltage) when the optical spot is located on a border or boundary between the groove portion (G) 201 and the land portion (L) 202.

In a so-called the tracking control, supervising or checking the change of this TE signal, the position of the optical spot is so controlled that the level of the TE signal comes to the standard or reference level. This tracking control is performed even when the write or erase of information is carried out, therefore in ordinary, the optical spot conducts the write or erase of information while depicting a normal locus, such as the locus 208 in the FIG. 2.

However, when occurring such the fluctuation which cannot be controlled nor managed by the tracking control, it causes the off track, thereby conducting the write or erase of information while depicting an abnormal locus, such as the locus 209 in the FIG. 2. In the conventional art mentioned above, it is so constructed that the possibility of the off track is detected by means of only one set or system of the comparator and the time counting device (i.e., pulse width detector), however if trying to do it only by the one set or system, it is impossible to dissolve at the same time the problems, such as the impossibility in detection of the off track phenomenon caused by the abrupt fluctuation of the optical spot and the erroneous detection of the off track phenomenon due to the noise in the TE signal. Therefore, according to the present embodiment, the both problems are dissolved at the same time with provision of two sets or systems of the comparator and the time counting device.

Explanation will be given on an advantage with the provision of the two sets or systems of the comparator and the time counting device by referring to FIG. 4(A) to (C). In those figure, a portion (1) shows the relationships between the TE signal inputted into the comparator 104 when the abrupt change or fluctuation occurs in the locus of the optical spot, the output signal of the comparator 104 (i.e., an input signal to the time counting device 105), and the output signal of the time counting device 105. Also, a portion (2) in those figures shows the relationships between the TE signal inputted into the comparator 110 when the slow change or fluctuation occurs in the locus of the optical spot, the output signal of the comparator 110 (i.e., an input signal to the time counting device 111), and the output signal of the time counting device 111. In both of the portions (1) and (2), FIG. 4(A) shows the TE signal to be inputted into the comparator and the comparison level to be compared, FIG. 4(B) the output signal to the comparator (i.e., input signal to the time counting device), and FIG. 4(C), an output signal of the time counting device (i.e., pulse width detector). In those figures, a horizontal axis indicates time, while a vertical one the voltage.

When the locus of the optical spot fluctuates abruptly as the locus 208-1 mentioned above, as shown in the portion (1) of the FIGS. 4(A) to (C), the TE signal 401-1 comes to be a signal in which the time duration of changing the voltage is short. In the first comparator 104, a voltage E1 is set as the first comparison level 402, so as to compare the absolute value of this voltage E1 and the absolute voltage value of the TE signal 401-1 (see the portion (1) of the FIG. 4(A)), thereby outputting the signal 404-1 to the time counting device 105 (i.e., pulse width detector) when the voltage of the TE signal exceeds the voltage E1 of the first comparison level 402, in which signal the voltage turns to be high during the period when it exceeds it (see the portion (1) of the FIG. 4(B)). Further, in the first time counting device 105 (i.e., pulse width detector), the time duration when the signal 404-1 turns to be high is measured or counted up, and only when the measured time duration exceeds the first time period t1, the signal 405-1 indicative of the exceeding thereof is outputted to the OR circuit 109 (see the portion (1) in the FIG. 4(C)).

In the first set of the first comparator 104 and the first time counting device 105, since the absolute value of the first comparison level 402 (i.e., the voltage E1) is set to be low, there is a possibility that the first comparator 104 detects even the fluctuation due to the noise(s) in the TE signal 401-1 so as to output the signal 404-1. However, by setting the first time period t1 to be long, and also since the small or minute fluctuation due to the noise(s) in the TE signal cannot continue for a long time, the possibility that the signal 405-1 is outputted from the first time counting device 105 (i.e., pulse width detector) comes to be low. Accordingly, it is possible to detect the abrupt fluctuation of the optical spot, such as the locus 209-1 without receipt of ill influence from the noise(s) in the TE signal.

However, it is preferable that the period t1 is set to be shorter than the time period starting from a time when the TE signal 401-1 rises up until a time when it reaches to the peak value. As is apparent by referring to the FIG. 3, the fact that the TE signal begins to fall down after exceeding the peak value indicates nothing else but that the locus of the optical spot has been already shifted or moved to other track. Accordingly, by setting the first time period t1 to be shorter than the time period starting from the time when the TE signal 401-1 rises up until it reaches to the peak value, it is possible to detect the off track phenomenon in advance, thereby enabling to protect from the write or erase onto the other track(s) before it actually happens.

On the other hand, as shown in the portions (2) of the FIGS. 4(A) to (C), when the locus of the optical spot fluctuates slowly, such as the locus 208-2 mentioned above, the TE signal 401-2 comes to be a signal in which the voltage varies for a long time period. In the second comparator 110, as the second comparison level 40 is set the voltage E2, so as to compare the absolute value of the voltage E2 to that of the voltage of the TE signal 401-2 (see, the portion (2) of the FIG. 4(A)), thereby the signal 404-2 is outputted to the time counting device 111 (i.e., pulse width detector) when the voltage of the TE signal exceeds the voltage E2 of the second comparison level 403, in which signal the voltage turns to be high during the period when it exceeds it (see the portion (2) of the FIG. 4(B)). Further, in the second time counting device 111 (i.e., pulse width detector), the time duration when the signal 404-2 turns to be high is measured or counted up, and only when the measured time duration exceeds the second time period t2, the signal 405-2 indicative of the exceeding thereof is outputted to the OR circuit 109 (see the portion (2) in the FIG. 4(C)).

In the second set or system of the second comparator 110 and the second time counting device 111 (i.e., pulse width detector), by setting the absolute value of the second comparison level 403 (i.e., the voltage E2) to be higher than that of the first comparison level 402 (i.e., the voltage E1),there is no possibility that it detects the fluctuation due to the noise(s) in the TE signal 401-2. And, further by setting the second time period t2 to be shorter than that of the first time period t1, it is possible to detect the slow fluctuation of the locus of the optical spot, such as the locus 209-2.

However, it is also preferable that the period t2 is set to be shorter than the time period starting from the time when the TE signal 401-1 rises up until the time when it reaches to the peak value, like the time period t1. Also, by setting the time period t2 to be shorter than the time period starting from the time when the TE signal 401-1 rises up until it reaches to the peak value, from the same reason mentioned in the above, it is possible to detect the off track phenomenon in advance, thereby enabling to protect from conducting the write or erase onto the other track before it actually happens.

Further, as apparent from the construction shown in the FIG. 1, the TE signal 401-1 is inputted not only to the first set or system but also to the second set or system, and the TE signal 401-2 is also inputted not only to the second one but also to the first one. Accordingly, there may be a case where the signal 405-2 is outputted from the second set upon the input of the TE signal 401-1 and also the signal 405-1 is outputted from the first set upon the input of the TE signal 401-2. However, since the gist of the present construction lies in that the off track phenomenon is detected in advance so as to stop the operation of write or erase when it is detected, there is no problem even if the signals 405-1 and 405-2 are outputted from both the first set and the second set.

According to the embodiment in which the two sets or system of the comparators and the time counting devices (i.e., pulse width detectors), the comparison levels of the comparators and the time periods of the time counting devices (i.e., pulse width detectors) can be set, with aiming at the detection of the slow fluctuation and the abrupt fluctuation in those sets or systems, respectively. Accordingly, it is possible to dissolve both, the problem about detection of the abrupt fluctuation of optical spot locus and the problem about the effect or influence of the fluctuation due to the noise(s) in the TE signal, at the same time. Accordingly, it is possible to make the optical information recording/reproducing apparatus able to reduce the erroneous detection of the off track phenomenon, and to reduce the possibility of conducting the operation of write or erase onto other track(s) as well.

Further, for the purpose of making the optical information recording/reproducing apparatus able to reduce the erroneous detection of the off track phenomenon and to reduce the possibility of conducting the operation of the write or erase onto other track(s), it is preferable to construct it so that the change in the base level of the TE signal is not confused with the fluctuation of the optical disc at the position in the radial direction thereof.

On the optical disc on which the groove portion 201 and the land portion 202 are formed one by one for each one (1) turn of the optical disc along the track, and on which the PID portion 204 is provided at a predetermined constant distance between the groove portion 201 and the land portion 202, like the optical disc 101 shown in the FIG. 2, the base level of the TE signal changes by itself in the groove portion 201, the land portion 202, and the PID portion 204, respectively.

Figure 5:
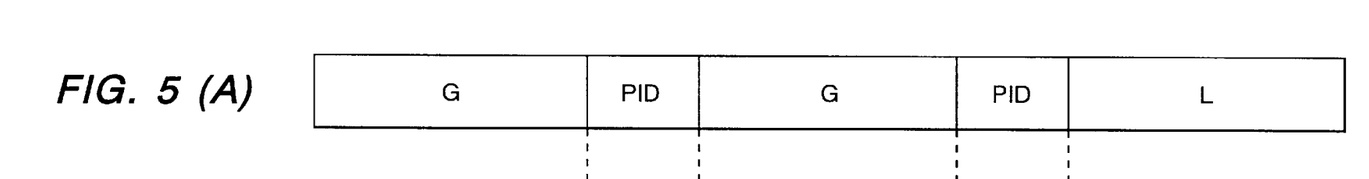

FIGS. 5(A) and (B) show a relationship between the portions, i.e., the groove portion 201, the land portion 202, and the PID portion 204, and the base level of: the TE signal 401. The FIG. 5(A) shows an order of scanning or tracing when the optical spot scans or traces along the locus 208 on the optical disc 101, and the FIG. 5(B) shows the base level of the TE signal 401 corresponding to the FIG. 5(A).

When the optical spot advances from the groove portion 201 to the PID portion 204, the base level is decreased down a little bit even when it does not fluctuate by itself at the position in the radial direction thereof. Further advancing and when it comes from the groove portion 201 through the PID portion 204 and into the land portion 202, not coming to be zero (0) immediately, but the base level of the TE signal 401 comes to be fluctuated greatly in spite of no fluctuation of the optical spot by itself in the radial direction thereof.

Since the fact that the level of the TE signal does fluctuate is true even though the optical spot itself does not fluctuate at the position in the radial direction thereof, the first comparator 104 outputs the signal 404-1 and/or the second comparator 110 outputs the signal 404-2, when an amount of the fluctuation exceeds the first comparison level 402 (the voltage E1) of the first comparator 104 or the second comparison level 403 (the voltage E2) in the second comparator 110. Accordingly, there is the possibility that a stop signal of write or erase is outputted so as to stop the operation of the write or erase of the information.

Therefore, in this preferable embodiment, it is so constructed that the TE signal 401 is not inputted into the first comparator 104 nor into the second comparator 110 during the time period after scanning or tracing on the PID portion 204. Not shown in the FIG. 1, however, a switching circuit may be provided between the optical head (pickup) 103 and the first comparator 104 and the second comparator 110 for shutting down the signal for the time period after receipt of a shut-down signal. In the optical information recording/ reproducing apparatus, the write or erase of the information is conducted while grasping the position where the optical spot is irradiated on the groove portion 201, the land portion 202 and the PID portion 204, it may be so constructed that the shut-down signal is outputted to the switching circuit mentioned above, just after passing through the PID portion 204 on which the pits 206 are formed.

Therefore, according to this preferable embodiment, it is possible to achieve such the construction that the change of the base level of the TE signal is not confused with the fluctuation of the locus of the optical disc, thereby obtaining the optical recording/reproducing apparatus, with which can be further reduced the erroneous detection of the off track phenomenon, as well as the possibility of the operation of the write or erase on other track(s).

Figure 4:
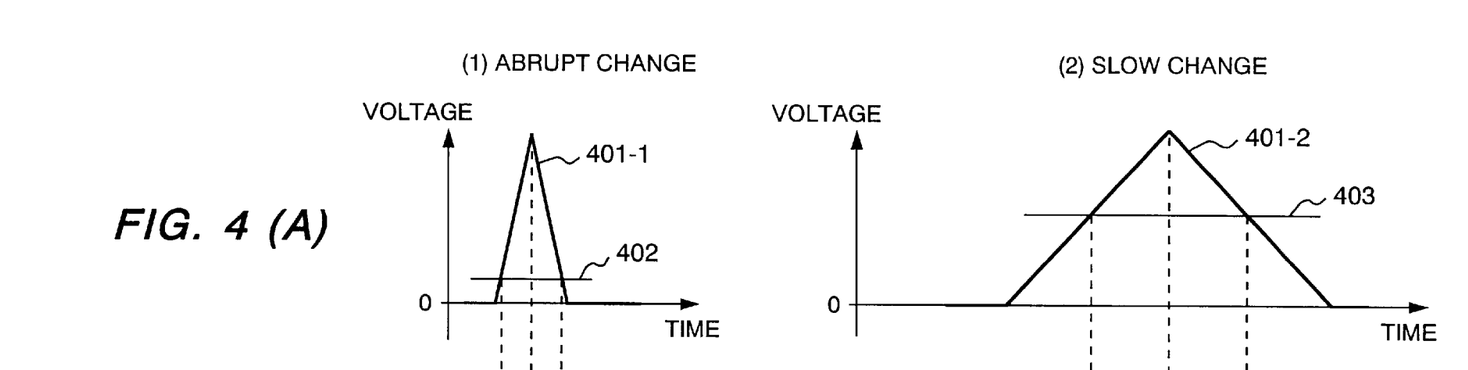
FIGS. 4(A) to (C) show relationships between the TE signal, an output signal of a comaparator (an input signal to a time counting device (i.e., pulse width detector)) and an output of the time counting device (i.e., pulse width detector), when an abrupt change and a slow change occur in a locus or track of an optical spot, respectively.

The comparison levels 402 and 403 are shown to have only positive (+) potentials at one side in the FIG. 4, although it is not necessary to mention again, however, the off track phenomenon can be actually detected with the potential having an absolute value being same to that at the negative side, by comparing it to the TE signal in the same manner.

Turning back to the explanation of the optical information recording/reproducing apparatus shown in the FIG. 1, while the fluctuation amount to the track 203 can be grasped or obtained from the TE signal 401, also an information of the pits 205 and 206 formed on the PID portion 204 of the optical disc 101 can be read out from the signal wave-form of the TE signal 401. Then, the TE signal is decoded in the PID decoder 106 so as to read out the information therefrom. Since a location information on the track is contained in the information of the pits in the PID portion, the optical information recording/reproducing apparatus can acknowledge on which track the optical spot is scanning or tracing now, every time when it passes through the PID portion. Also, in a PID register 107 is recorded an information indicative of an order of the location information of the tracks read out from the optical disc in advance, before performing the recording and/or reproducing of the information. Then, in the comparator 108, the location information in the PID portion which will be reproduced, being outputted from the PID register 107, and the location information in the PID portion read out by the PID decoder 106 are compared. When the comparison results are not coincide with, it can be seen that the optical spot comes to be off track onto other one(s) erroneously, therefore the signal is outputted to the OR circuit 109.

And, the OR circuit 109 outputs the stop signal of the write or erase when the signal is outputted from the comparator 108, so that the operation of the write or erase of the information is stopped.

With the detection method by comparing to the output of the TE signal mentioned in the above, the detection of the off track sometimes comes to be impossible in a case where an amplitude of the TE signal is reduced due to the optical fluctuation of the optical head (or pickup) 103, or when the time width of the output 404-1 is shorter than t1, exceeding the abrupt change which is set in the FIGS. 4(A) to (C). Also, as shown in the FIG. 3, the absolute output of the TE signal 401 reaches to the maximum at a center between the tracks, and it comes to be zero (0) at a center of each of the tracks. Then, in a case where the optical spot is shifted or moved to a central portion of an adjacent track without detecting the off track once, it is impossible to detect the off track from the amplitude of the TE signal until when the next PID is reproduced. Accordingly, for further improving an accuracy in detecting the off track phenomenon, it is preferable to provide a means for acknowledging the case that the optical spot is scanning or tracking the central portion of the adjacent track, so as to stop the operation of write or erase.

Other than the detection of the off tack by means of the two sets or systems of the comparators and the time counting devices (i.e., pulse width detectors) mentioned in the above, according to the embodiment in which the off track detection is carried out by the comparator 108, in addition to the effect mentioned above, the erroneous write or the erroneous erase due to the off track can be suppressed within a range of the groove portion or of the land portion where the optical spot moves to when the off track occurs. Explaining this by referring the example shown in the FIG. 2, for example, after scanning or tracing on the PID portion 204 like the locus 209-1 or 209-2, if the locus of the optical spot is shifted or moved to other track before scanning or tracing the next PID portion to continue the operation of write or erase at the worst, it can be acknowledged the fact that it is shifted or moved to other track by reading out the location information of the PID portion from the pits 206 in the next coming PID portion 204. Accordingly, the operation of write or erase of the information is not continued onto the groove portion 201 and the land portion 202 which will be scanned or traced after the pits 206, thereby enabling to suppress the erroneous recording or the erroneous erase due to the off track within the range of the groove portion or the land portion where the optical spot moves to when the off track occurs.

Further, explanation will be given on the optical information recording/reproducing apparatus shown in the FIG. 1. A PLL circuit 112 is a circuit for producing a synchronous timing signal necessary for recording or reproducing of information responding to a synchronous timing information (wobble formed on the optical disc 101, in a case of the optical disc 101 shown in the FIG. 1) recorded on the optical disc in advance. Although the boundary between the groove portion 201 and the land portion 202 of the optical disc in the radial direction thereof is depicted by a strait line in the FIG. 2, however there is an optical disc in which this boundary is wobbled at a certain period, among various optical discs. Hereinafter, explanation will be given assuming that the boundary is wobbled on the optical disc 101.

For example, when the optical spot is scanned or traced on such as the locus 208 shown in the FIG. 2, namely when it is possible to adjust the locus of the optical spot by means of the tracking control, the period of the wobble can be detected from the TE signal, and a synchronous timing signal necessary for the recording or reproducing can be produced upon the basis of the period of this wobble.

A synchronous timing signal, being synchronized in phase with a signal obtained by binarizing the reproduced signal of the wobble, is produced by means of the PLL circuit 112, and the processes of the recording or writing, erasing and reproducing are carried out on the basis of that synchronous timing signal. In this instance, a phase difference between the binarized signal and the synchronous timing signal is detected in the PLL circuit 112, and the operation of detecting the phase difference is stopped, so as to fix the output frequency of the synchronous timing signal, or when the wobble signal is omitted due to defect(s) on the optical disc, when the wobble signal cannot be produced due to the fluctuation in the tracking control, or when the phase difference exceeds the determined range for protecting the operation of the PLL. Accordingly, the signal being synchronous with the phase of the wobble signal on the original track can be produced even when the off track occurs.

Also, the wobble reproduction signal is theoretically shifted by a half wave-length (180°) in phase, at the position where the land track and the groove track are aligned with in the radial direction. Accordingly, when the off track occurs, it is possible to prevent from destruction of information on the adjacent track(s) due to the off track with certainty, by stopping the operation of write or erase when detecting the phase difference being over than the predetermined value.

Under a condition where the TE signal is still fluctuating just after the PID portion, since the wobble signal can be detected normally, therefore the off track can be detected even in the time period when the comparator 104 or 110 mentioned above is stopping the operation thereof, with certainty.

Figure 8:
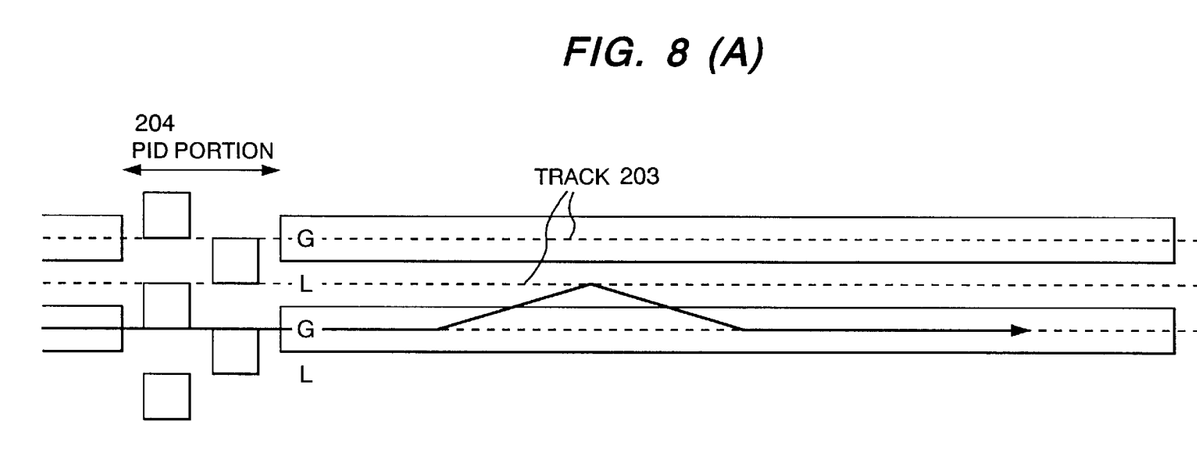

As is shown in FIG. 8, when the off tack occurs, and if the locus of the optical spot is drawn to the said track again by the tracking mechanism after passing to the adjacent track (FIG. 8(A)), the write or erase operation will be stopped. Also, when defect(s) occurs inside the optical disc or when dust(s) adheres upon the optical disc surface (FIG. 8(B)), no wobble signal can be detected, and then the write or erase operation will be stopped since the phase difference comes to be greater than the determined value as a result.

In this instance, by reproducing the information of the PID being reproduced next, it is decided whether the optical spot is scanning or tracing upon the track on target or not. When detecting it upon the track on target, the recording or reproducing of the following sectors may be started again.

However, in a case where the optical spot fluctuates on the locus thereof so that the tracking control cannot be performed, it is impossible to produce the synchronous timing signal from the TE signal 401. When the synchronous timing signal cannot be produced from the wobble formed on the optical disc 101, the PLL circuit 112 outputs a hold signal. When the hold signal is outputted, the optical information recording/reproducing apparatus is in synchronization with a period or cycle for the recording or reproducing of information, being same to the period or cycle of the synchronous timing signal produced before the synchronous timing signal cannot be produced from the wobble.

Figure 7:
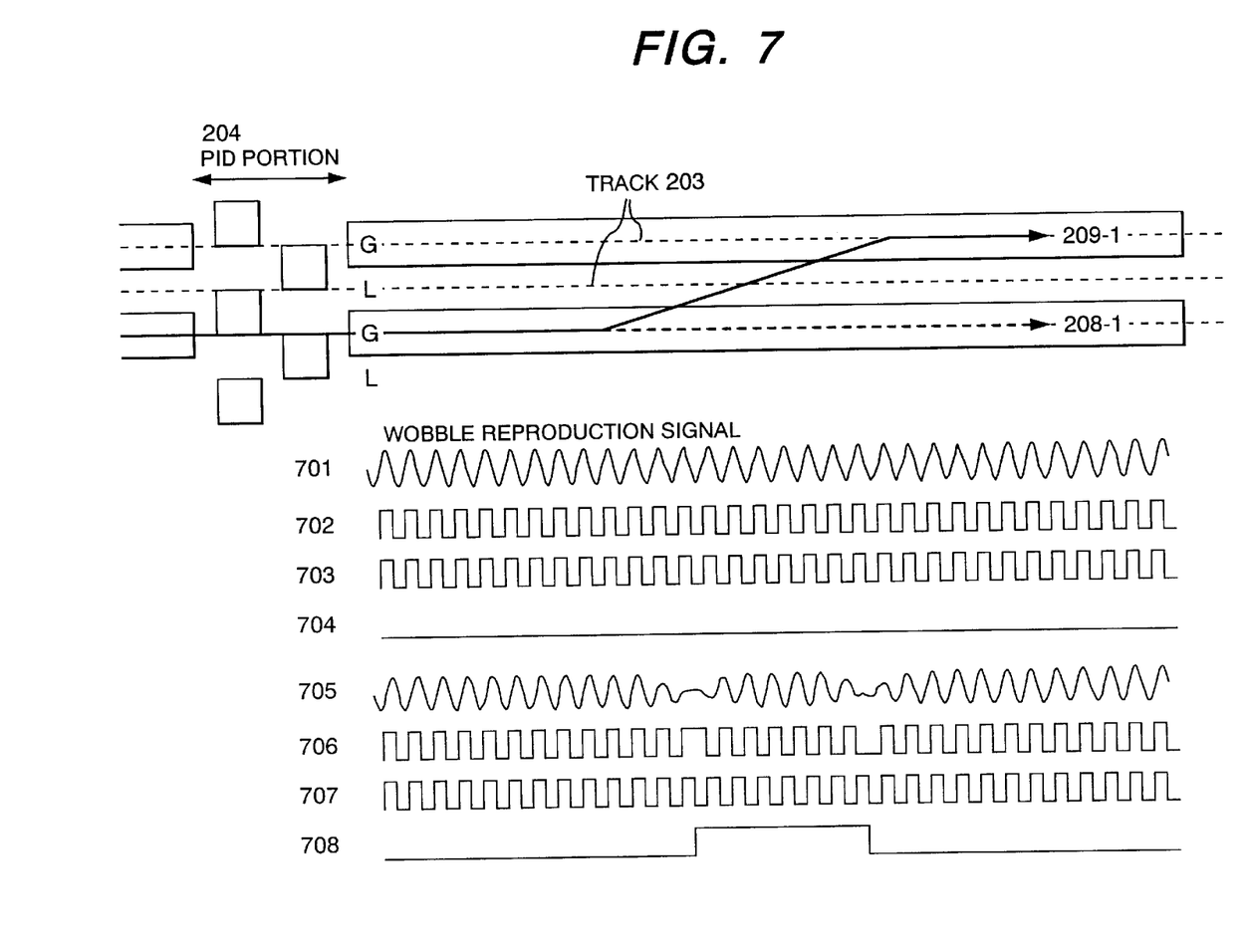
FIG. 7 shows wave-forms for showing relationships between the locus of the optical spot, a wobble detection signal and an output signal of a phase difference detector circuit, when operating under a normal condition and when occurring the phenomenon of off track.

FIG. 7 shows the loci of the optical spots, the wobble signal and the hold signal of the PLL circuit 112. When the optical spot scans or traces on the locus 208-1, the wobble reproduction signal 701 is extracted from the TE signal 401, and a binarized signal 702 is obtained from that. In this instance, the synchronous timing signals 703 and 702 of the PLL circuit 112 are compared in the phases thereof, but no hold signal is outputted.

When the off track occurs as indicated by the locus 209-1, since the land track and the groove track are theoretically shifted by 180° in the phase of the wobble reproduction signals thereof in the radial direction, the signal 706 obtained by binarizing the reproduction signal 705 and the synchronous timing signal 707 are compared in the phases, so as to output the hold signal 708.

In this instance, it is possible to detect the off track onto the adjacent track by means of the hold signal, thereby enabling to stop the operation of the write or erase with certainty.

Inherently, the hold signal indicates that the synchronous timing signal cannot be produced from the information on the optical disc, and it is common that the hold signal is utilized in the manner mentioned in the above. However, the fact that the hold signal is outputted from the PLL circuit 112 means that the optical spot fluctuates on the locus thereof so that the adjustment on the locus of the optical spot cannot be conducted by means of the tracking control, such as the locus 209 shown in the FIG. 2, for example. Then, according to the present embodiment, by deciding whether the hold signal is outputted or not, the off track away from the locus of the optical spot is detected.

Accordingly, the present embodiment is so constructed that the hold signal outputted from the PLL circuit 112 is inputted into the OR circuit 109 as shown in the FIG. 1. The OR circuit 109 outputs the stop signal of write or erase, thereby stopping the write or erase operation of the information by means of the optical information recording/reproducing apparatus.

According to the embodiment of deciding whether the hold signal is outputted or not, the erroneous detection of the off track phenomenon can be reduced down, thereby achieving the optical information recording/reproducing apparatus lowering the possibility of the operation of write or erase onto other track(s).

In the above, explanation was given on the construction shown in the FIG. 1 as one example of the block diagram of the optical information recording/reproducing apparatus in which the present invention is applied to, however the present invention should not be restricted only to such the construction as shown in the FIG. 1.

The gist of the present invention is (1) to provide the optical information recording/reproducing apparatus, wherein two sets or systems of structures are provided for detecting that the fluctuation larger than the comparison level continues in the TE signal for a time period, each being set at the respective comparison level and the time duration differently, thereby to stop the operation of write or erase onto the optical disc even if only one of them is detected, (2) to provide the optical information recording/reproducing apparatus, wherein the location information of the PID portion to be reproduced, being outputted from the PID register, and the location information which is read out by the PID decoder are compared by the comparator, so as to stop the operation of write or erase onto the optical disc if they are inconsistent with, and (3) to provide the optical information recording/reproducing apparatus, wherein the operation of write or erase onto the optical disc is stopped if the PLL circuit outputs the hold signal.

According to the present invention, there can be provided the optical information recording/reproducing apparatus, with which the erroneous detection of the off track phenomenon can be reduced down, thereby lowering the possibility of conducting the write or erase operation erroneously on other track(s).

What is claimed is:

1. An optical information recording/reproducing apparatus for performing an operation of write or erase of information on an optical disc, comprising:

means for irradiating an optical spot on said optical disc;

means for controlling fluctuation in position of said optical spot, with respect to a track center on said optical disc, in a radial direction thereof;

a first means for stopping the operation of the write or erase of information, if a fluctuation in position of said optical spot in the radial direction is equal or more than a first fluctuation amount and if a time period during when the positional fluctuation is equal or more than the first fluctuation amount is equal or longer than a first time period; and a second means for stopping the operation of the write or erase of information, if a fluctuation in position of said optical spot in the radial direction is equal or more than a second fluctuation amount and if a fluctuation time period during when the positional fluctuation is equal or more than the second fluctuation amount is equal or longer than a second time period.

2. An optical information recording/reproducing apparatus as defined in the claim 1, wherein said first fluctuation amount is smaller than said second fluctuation amount, and said first time period is longer than said second time period.

3. An optical information recording/reproducing apparatus for performing an operation of write or erase of information on an optical disc, comprising:
   means for irradiating an optical spot on said optical disc;
   means for controlling irradiation position of said optical spot upon basis of a tracking error signal;
   a first means for stopping the operation of the write or erase of information, if a voltage of said tracking error signal exceeds a first comparison level and if a time period during when the voltage of said tracking error signal exceeds the first comparison level is equal or longer than a first time period; and
   a second means for stopping the operation of the write or erase of information, if the voltage of said tracking error signal exceeds a second comparison level and if a time period during when the voltage of said tracking error signal exceeds the second comparison level is equal or longer than a second time period.

4. An optical information recording/reproducing apparatus as defined in the claim 3, wherein said first comparison level is set to be lower than said second comparison level, and said first time period is set to be longer than said second time period.

5. An optical information recording/reproducing apparatus for performing an operation of write or erase of information on an optical disc, comprising:
   means for irradiating an optical spot on said optical disc;
   means for controlling fluctuation in position of said optical spot, with respect to a track center on said optical disc, in a radial direction thereof;
   a synchronous timing signal producing means for producing the synchronous timing signal upon basis of the synchronous timing information being read out from a reflection light of irradiation light upon said optical disc;
   a first means for stopping the operation of the write or erase of information, if a fluctuation in position of said optical spot in the radial direction is equal or more than a first fluctuation amount and if a time period during when the positional fluctuation is equal or more than the first fluctuation amount is equal or longer than a first time period;
   a second means for stopping the operation of the write or erase of information, if a fluctuation in position of said optical spot in the radial direction is equal or more than a second fluctuation amount and if a time period during when the positional fluctuation is equal or more than the second fluctuation amount is equal or longer than a second time period; and
   a third means for stopping the operation of the write or erase of information, if said synchronous timing signal producing means cannot produce said synchronous timing signal upon basis of said synchronous timing information.

6. An optical information recording/reproducing apparatus as defined in the claim 5, wherein said first fluctuation amount is smaller than said second fluctuation amount, and said first time period is longer than said second time period.

7. An optical information recording/reproducing apparatus for performing an operation of write or erase of information on an optical disc, comprising:
   means for irradiating an optical spot on said optical disc;
   means for controlling irradiation position of said optical spot upon basis of a tracking error signal;
   a synchronous timing signal producing means for producing the synchronous timing signal upon basis of the synchronous timing information being read out from a reflection light of irradiation light upon said optical disc;
   a first means for stopping the operation of the write or erase of information, if a voltage of said tracking error signal exceeds a first comparison level and if a time period during when the voltage of said tracking error signal exceeds the first comparison level is equal or longer than a first time period;
   a second means for stopping the operation of the write or erase of information, if the voltage of said tracking error signal exceeds a second comparison level and if a time period during when the voltage of said tracking error signal exceeds the second comparison level is equal or longer than a second time period; and
   a third means for stopping the operation of the write or erase of information, if said synchronous timing signal producing means cannot produce said synchronous timing signal upon basis of said synchronous timing information.

8. An optical information recording/reproducing apparatus as defined in the claim 7, wherein said first comparison level is set to be lower than said second comparison level, and said first time period is set to be longer than said second time period.

9. An optical disc information recording/reproducing apparatus for performing an operation of write/erase of information on an optical disc, comprising:
   a pickup for irradiating an optical spot on said optical disc and reading out a tracking error signal from a reflection light of the irradiation light upon said optical disc;
   a first comparator for comparing an absolute value of a voltage of said tracking error signal and an absolute value of a first voltage level, and outputting a first signal when the absolute value of the voltage of said tracking error signal is equal or larger than the absolute value of the first voltage level;
   a first counter for counting a time duration of outputting said first signal, and outputting a second signal when the time duration of outputting said first signal is equal or longer than a first time period;
   a second comparator for comparing the absolute value of the voltage of said tracking error signal and an absolute value of a second voltage level, and outputting a third signal when the absolute value of the voltage of said tracking error signal is equal or larger than the absolute value of the second voltage level;
   a second counter for counting a time duration of outputting said third signal, and outputting a forth signal when the time duration of outputting said third signal is equal or longer than a second time period; and
   an OR circuit for outputting a fifth signal, when inputting either one of the second signal and the fourth signal, whereby the operation of white/erase of information on the optical disc is stopped when said OR circuit outputs the fifth signal.

10. An optical disc information recording/reproducing apparatus according to the claim 9, wherein the absolute value of the first voltage level is larger than the absolute value of the second voltage level, and the first time period is longer than the second time period.

11. An optical disc information recording/reproducing apparatus for performing an operation of write/erase of information on an optical disc, comprising:
   a pickup for irradiating an optical spot on said optical disc and reading out a tracking error signal from a reflection light of the irradiation light upon said optical disc;

a first comparator for comparing an absolute value of a voltage of said tracking error signal and an absolute value of a first voltage level, and outputting a first signal when the absolute value of the voltage of said tracking error signal is larger than the absolute value of the first voltage level;

a first counter for counting an outputting time of said first signal, and outputting a second signal when the outputting time of said first signal is longer than a first time period;

a second comparator for comparing an absolute value of a voltage of said tracking error signal and an absolute value of a second voltage level, and outputting a third signal when the absolute value of the voltage of said tracking error signal is larger than the absolute value of the second voltage level;

a second counter for counting an outputting time of said third signal, and outputting a forth signal when the outputting time of said third signal is longer than a second time period;

an OR circuit for outputting a fifth signal, when inputs the second signal or the forth signal;

a pickup for irradiating an optical spot on said optical disc and reading out a synchronous timing information from a reflection light of the irradiation light upon said optical disc; and a PLL circuit for producing a synchronous timing signal upon basis of the synchronous timing information, whereby the operation of write/erase of information on an optical disc is stopped when said OR circuit outputs the fifth signal or when said PLL circuit fails to produce the synchronous timing signal.

12. An optical disc information recording/reproducing apparatus according to the claim 11, wherein the absolute value of the first voltage level is larger than the absolute value of the second voltage level, thereby the first time period is longer than the second time period.

13. An optical disc information recording/reproducing apparatus according to the claim 11, wherein said PLL outputs a sixth signal when a phase difference between the synchronous timing information and the synchronous timing signal exceeds a predetermined range, thereby the operation of write/erase of information on an optical disc is stopped when said PLL circuit outputs the sixth signal.

14. An optical disc information recording/reproducing apparatus according to the claim 11, wherein the absolute value of the first voltage level is larger than the absolute value of the second voltage level, the first time period is longer than the second time period, and said PLL outputs a sixth signal when a phase difference between the synchronous timing information and the synchronous timing signal exceeds a predetermined range, thereby the operation of write/erase of information on an optical disc is stopped when said PLL circuit outputs the sixth signal.

* * * * *